United States Patent
Seppä

(10) Patent No.: US 7,671,721 B2
(45) Date of Patent: Mar. 2, 2010

(54) REMOTE SENSOR, DEVICE AND METHOD FOR ACTIVATING SELECTED REMOTE SENSOR COMPONENTS

(75) Inventor: Heikki Seppä, Helsinki (FI)

(73) Assignee: Valtion Teknillinen Tutkimuskesus, Espoo (FI)

( * ) Notice: Subject to any disclaimer, the term of this patent is extended or adjusted under 35 U.S.C. 154(b) by 1019 days.

(21) Appl. No.: 10/555,014

(22) PCT Filed: May 11, 2004

(86) PCT No.: PCT/FI2004/000281

§ 371 (c)(1), (2), (4) Date: Nov. 1, 2005

(87) PCT Pub. No.: WO2004/100058

PCT Pub. Date: Nov. 18, 2004

(65) Prior Publication Data

US 2006/0202802 A1    Sep. 14, 2006

(30) Foreign Application Priority Data

May 12, 2003    (FI) .................................. 20030706

(51) Int. Cl.
*H04Q 5/22* (2006.01)
(52) U.S. Cl. .................. 340/10.34; 340/572.8
(58) Field of Classification Search .................. 340/10.3
See application file for complete search history.

(56) References Cited

U.S. PATENT DOCUMENTS

| | | | | |
|---|---|---|---|---|
| 4,931,789 A | * | 6/1990 | Pinnow | ...................... 340/5.64 |
| 5,300,875 A | * | 4/1994 | Tuttle | ........................ 320/138 |
| 5,825,045 A | | 10/1998 | Koenck et al. | |
| 6,002,344 A | | 12/1999 | Bandy et al. | |
| 6,335,685 B1 | * | 1/2002 | Schrott et al. | ............ 340/572.1 |
| 6,424,285 B1 | * | 7/2002 | Perdue et al. | ................ 341/176 |
| 6,542,083 B1 | | 4/2003 | Richley et al. | |
| 7,002,474 B2 | * | 2/2006 | De Souza et al. | ........ 340/572.3 |
| 2001/0020897 A1 | * | 9/2001 | Takatori et al. | .......... 340/572.7 |
| 2002/0043559 A1 | * | 4/2002 | Wrasman et al. | ............ 235/435 |
| 2005/0040241 A1 | * | 2/2005 | Raskar | ........................ 235/492 |
| 2005/0040961 A1 | * | 2/2005 | Tuttle | ..................... 340/693.3 |
| 2005/0258939 A1 | * | 11/2005 | Kantrowitz et al. | ........ 340/10.1 |
| 2008/0117025 A1 | * | 5/2008 | Tuttle | ........................ 340/10.3 |

FOREIGN PATENT DOCUMENTS

| | | |
|---|---|---|
| JP | 2003021679 A | 1/2003 |
| WO | WO-03/036552 A1 | 5/2003 |

* cited by examiner

*Primary Examiner*—Daniel Wu
*Assistant Examiner*—Brian Wilson
(74) *Attorney, Agent, or Firm*—Birch, Stewart, Kolasch & Birch, LLP

(57) ABSTRACT

This publication discloses a remote identifier, a reader, and a method for activating a desired remote identifier. The remote identifier (2) includes a microcircuit (7), in which there is a memory and means for processing a radio-frequency signal, an antenna (6) connected to the microcircuit (7), by means of which both the signal and also electric power for the operating voltage of the microcircuit (7) can be received. According to the invention, a component (3), the electrical properties of which change due to the effect of infrared, or visible light, is electrically connected to the microcircuit (7) of the remote identifier and in the microcircuit (7) there are means, by which the combined effect of a change in the radio-frequency signal and the electrical component (3) can be expressed by a correlation method for the signals, in order to activate the remote identifier (2) for two-way data transmission.

7 Claims, 2 Drawing Sheets

REMOTE SENSOR, DEVICE AND METHOD FOR ACTIVATING SELECTED REMOTE SENSOR COMPONENTS

The present invention relates to a remote identifier according to the preamble of Claim 1.

The invention also relates to an apparatus and method for activating desired remote-identifier components.

The use of remote identifiers (RFID) will increase in the near future. They will largely replace, for example, optically-read bar-codes in the tagging of products. A remote identifier is a tag that is read remotely using a radio signal, and which includes an antenna, a voltage-generation circuit, rf-signal modulation/demodulation circuits, and a memory. The memory can be both written and read with the aid of the radio signal.

There are several types of remote identifiers: passive and active, as well as those that can be connected inductively, capacitively, or with the aid of a radio-frequency radiation field. Passive remote identifiers generate the electrical energy they need from the rf-field aimed at them. Active identifiers contain a separate battery. Inductively-connected remote identifiers typically operate at frequencies of 125 kHz or 13.56 MHz.

This invention concerns a passive remote identifier read using a radio-frequency radiation field. In Europe, the 868-870 MHz band and the 2.4-2.4835 GHz ISM (Industrial Scientific Medical) band have been reserved for this operation.

Remote sensors can be considered to be a sub-set of remote identifiers. A remote sensor has essentially the same operating principle as a remote identifier. In place of, or in addition to the memory, there are circuits for converting a quantity (e.g., pressure, temperature) into a transmittable form. Remote sensors have the advantage that wireless reading eliminates the need for cables. The cable and its installation usually form a considerably larger cost item than the sensor itself.

If a product, or goods are tagged using a remote identifier utilizing UHF or microwave-frequency radio waves, the reader can be made small enough to be held in the hand. The reader can also be integrated as part of a mobile telephone. Though the reader is small, the reading distance can be several meters.

If a user wants data concerning a product they see, the following problem arises—they must read the data of all of the products that are nearby, then use a menu to select the correct product from a set of several products.

This is because the wavelength of a microwave is typically longer than the size of the reader, which means that the microwaves can only be partly aimed. In principle, the user can defined the product sufficiently precisely for only the data on the desired product to be transmitted to the device. The differences between products are often so small (different sizes of shoe) that the selection is laborious, while in addition the user does not have the code for searching for a specific product. If a mobile telephone is made to be able to control all kinds of devices, to read different kinds of goods, most of the memory of the mobile telephone will be used for storing this information. Another example is controlling a device (e.g., a television). If we want to control nearby devices, according to existing technology we select a suitable operating device from a menu and control it.

The situation can also be arranged so that all devices nearby automatically hand over the ability to control them to a mobile telephone. Both of the aforementioned solutions are clumsy.

The invention is intended to create an entirely new type of remote identifier and an apparatus and method for activating desired remote-identifier components, with the aid of which the problems of the prior art described above can be solved.

The invention is based on using a reader to actively select a remote-identifier component, either by bringing the reader sufficiently close to the remote identifier, or by pointing to the remote-identifier component over another transmission path, typically an optical signal.

In one preferred embodiment of the invention, the reader is brought into the immediate vicinity of the tag and a low reading power is used so that the other tags do not come into reading range.

In a second preferred embodiment of the invention, the remote identifier or sensor is targeted using a different frequency to the reading frequency, typically using infrared or visible light.

The second frequency is preferably synchronized with the reading frequency.

The sensor according to the invention is equipped with means for indicating this second frequency. In practice, this means can be an element with a conductivity that changes due to the effect of light.

More specifically, the remote identifier according to the invention is characterized by what is stated in the characterizing portion of Claim 1.

The reader according to the invention is, in turn, characterized by what is stated in the characterizing portion of Claim 3.

The method according to the invention in the reader is, in turn, characterized by what is stated in the characterizing portion of Claim 5.

The system according to the invention is, in turn, characterized by what is stated in the characterizing portion of Claim 6.

The method according to the invention is, in turn, characterized by what is stated in the characterizing portion of Claim 7.

Considerable advantages are gained with the aid of the invention.

With the aid of the invention, a desired remote identifier and its related product can be selected in a situation, in which several remote identifiers are within the range of the reader. Such a situation can arise, for example, in a shop, in which nearly all the products are equipped with a remote identifier.

The invention also permits a new user interface to be transferred to a reader, such as a mobile station. Thus, according to the invention, the mobile station can be converted, for example, into a remote control for a TV, DVD, or other remotely controlled device.

One preferred embodiment of the invention permits product data to be read using a contact method.

For its part, the synchronization of the two different signals in the activation event allows a remote identifier according to the invention to be manufactured at very low cost. For example, the photosensitive identifier element can be made from cheap and unstable material.

In the following, the invention is examined with the aid of examples and with reference to the accompanying drawings.

The reader according to the invention can be an entirely independent unit, which is intended only for reading remote identifiers. However, such a reader is typically integrated in connection with some second device. A very natural and technically suitable device for implementing the functions of a reader is a mobile station, typically a mobile telephone. Mobile stations include an antenna, a radio-frequency component, a microprocessor, a memory, and a battery acting as a power supply, making it an easy and cost-effective task to integrate a reader in such a unit. The combination of a reader with a mobile station is disclosed in, for instance, PCT application FI02/00818.

From the user's viewpoint, the user interface operates by the user either touching or pointing to the product in one way or another, so that in this way only this product's data is transferred to the reader, or the device in question activates and transfers the ability to control it to the mobile station. Products or goods that the user 'touches' with the device can be called TouchMe products.

If the product is far away and the user does not want to, or cannot touch the product, they can point to the product using a laser or lamp in the reader. Such products can be termed PointMe products.

Consider a situation, in which a person enters a room, in which there is a television. They notice that there is a sticker on the television, stating that the device is according to the pointing system (PointMe). They point their mobile telephone at the sticker, in which case the sticker tells the mobile station that the TV can be controlled with the aid of Bluetooth. The sticker on the TV automatically initiates the mobile station's Bluetooth and 'calls' the Bluetooth receiver in the television. The TV's Bluetooth transfers a menu to the mobile station and simultaneously the television is switched on. Because the user's mobile station knows that the user wants to watch, for example, the CNN news, the mobile station sends this information to the TV, which selects this channel. In other words, simply having the mobile station pointing towards the TV leads to the selection of the correct channel for the user while, in addition, the mobile station is given the ability to change channel and control, for example, the sound volume. The technology disclosed in this invention allows the properties in question to be added to all devices with an infrared, Bluetooth, GPRS, or some other wireless communications functionality.

This invention discloses the technical solutions required to implement both the touching (TouchMe) and pointing (PointMe) concepts.

Figure 1:
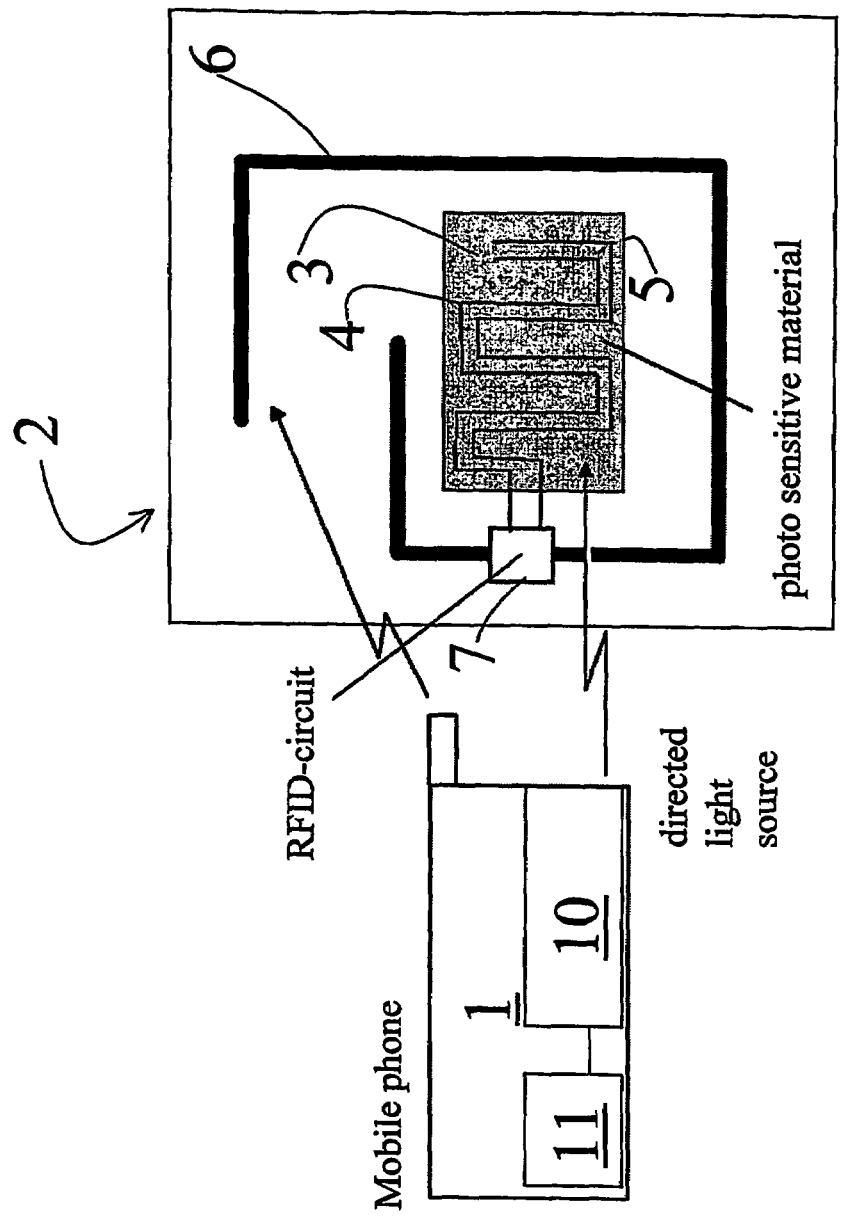
FIG. 1 shows schematically the remote identifier according to the invention and its reader.

FIG. 1 shows in general the manner, in which a mobile station 1 activates a remote identifier 2, with the aid of a photosensitive material 3 added to the antenna laminate. Two conductive electrodes 4 and 5, the resistance between which is measured by current-measurement using an RFID circuit 7, are located inside the photosensitive material. An antenna 6, with the aid of which the remote identifier communicates with the reader, in this case the mobile station, is also connected to the RFID circuit 7. The mobile station includes a light source 10, which can be a semiconductor laser in the visible-light or infrared range. Alternatively, the light source can be a normal incandescent-wire lamp, with suitable focussing optics. At least in some embodiments, the light source should be able to form a beam narrow enough for only a single remote identifier 1 to be selected for reading. A suitable beam width (diameter) for the light is 10-50 cm at a distance of five meters from the reader. However, the suitable beam width will always vary according to the target.

The light source is controlled using a control circuit 11, which pulses the light at the same frequency as the radio-frequency signal. The modulation of the light source can be implemented using an electrically controlled switch, the modulation being textbook information and will not be described in greater detail in this connection.

If the product is of a touch type (so-called TouchMe type), the user presses a button in the mobile station 1, which activates reading. The device adjusts the reading power to be so low that only a sticker that is very close will be activated. The power is increased until one, and only one sticker is activated. The maximum power is limited, so that reading will only succeed if the sticker is at an agreed distance (e.g., 5 cm) from the reader. By this procedure, it is highly probable that the device will read only one sticker that is even closer. If the products are so close to each other that they activate at the same power, the correct sticker can be selected on the basis of the strength of the reflected signal. When using UHF and microwaves, touch reading (TouchMe) often takes place at a distance that is shorter than the wavelength.

This means that in practice a radiation field is not used, instead the connection to the product is formed using either a magnetic field or an electrical field. The antenna of the reader and correspondingly the antenna of the sticker should therefore be designed to be compatible with each other.

If photosensitive material 3 is added to the circuit and/or antenna according to FIG. 1, the remote identifier 2 will become sensitive to visible light, or infrared radiation. One preferred way of adding photosensitivity to the remote identifier 2 is to surface the antenna entirely or partly with an electrically conductive polymer, which can be manufactured to be semiconducting. To convert the light into electricity, it is possible to use a photo-acoustic phenomenon, a pyro-electrical phenomenon, or semiconductors (e.g., semiconducting polymers), in which the number of charge-carriers depends on the strength of the light. In principle, the photosensitivity can be located in either an integrated circuit, or in the antenna laminate. However, in the case of a remote identifier, the signal is so weak and the power of the remote identifier so small that it is very difficult to use only a single value to express the light. It should also be noted, that ambient light levels vary continuously and the sensitivity of a cheap photoelectric detector depends on both the time and the lighting.

Because in remote-identifier technology the power is fed to the circuit by radio, the amplitude modulation of the radio signal, or the pulse-width modulation of the pulse, sent by the mobile station, can be synchronized with the amplitude modulation of the light.

A simple solution is created by modulating the amplitude of a microwave or a radio-frequency signal, using the same frequency as in the modulation of the intensity of the light source. Another simple method is to modulate the remote-identifier circuit electrically using a frequency f and the light using the frequency f/2. In the remote identifier, the frequency f is divided by two and is correlated against the light signal (f/2). The use of different frequencies helps to symmetrize the signal and to eliminate crosstalk. As the remote-identifier circuit 1 receives very highly correlated signals over two routes, we can considerably improve the ability of the remote-identifier 1 to distinguish the desired light signal from other signals.

Figure 2:
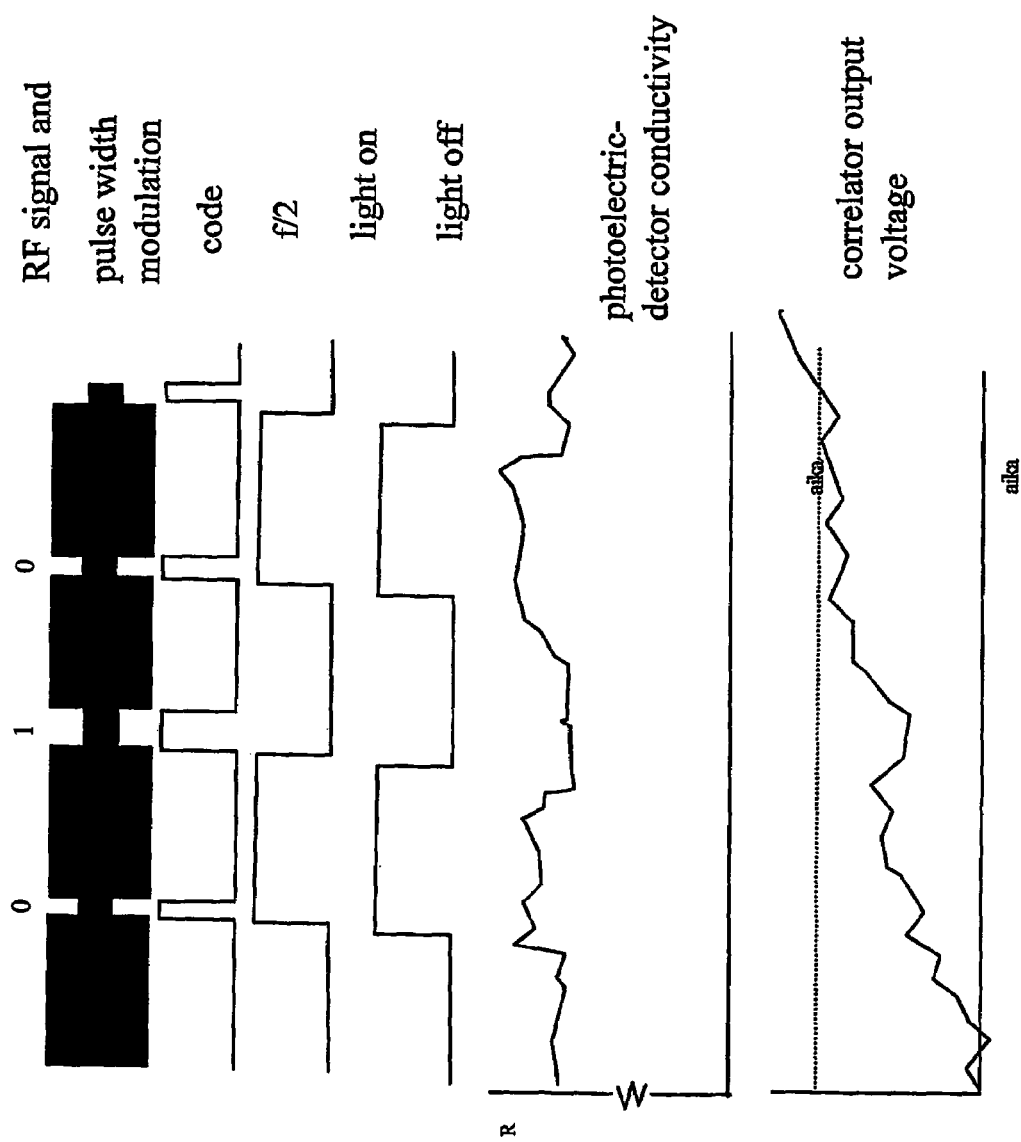
FIG. 2 shows the behaviour of the signals according to the invention on a time axis.

FIG. 2 shows one simple method for combining a light signal and an RF signal. The explanations of the waveforms are shown at the right-hand end of each curve. The curves have a common horizontal time axis. In the following, reference is also made to the numbered elements of FIG. 1. In the method, a microwave signal is modulated using pulse-width modulation at a frequency f and a symmetrical square-wave at a frequency f/2 is made by division from this signal. The light is modulated at the frequency f/2, which leads to the modulation, at the frequency f/2, of the value of the resistance 3 in the laminate. In the figure, this is shown by the curve depicting the conductivity of the photoelectric detector 3. The conductivity signal is obtained from measuring the current between the electrodes 4 and 5. In this simple procedure, the electrically produced symmetrical signal at the frequency f/2 is fed as voltage between the electrodes 4 and 5. The current is thus determined from the conductivity of the resistance 3, which, in turn, depends on the external lighting. If the value of the resistance does not correlate at the frequency f/2 the current flowing through the resistance averages zero. If, however, the resistance value varies at the frequency f/2 and is phase-synchronized with the electrically produced signal, a direct-current component appears in the current and is detected by the comparator after the filter (the lowest curve in FIG. 2). This voltage signal, which is proportional to the current, is integrated for a predefined time, typically a few tens-hundred of milliseconds and, if a predefined voltage limit (the broken line in the figure) is reached, two-way communications are activated between the remote identifier 2 and the reader 1.

Thus, in the method according to the invention, the electrical signal is compared in the remote identifier with the light signal, or with some other independent signal coming from the reader and, if a correlation is detected between these two signals, the remote identifier 2 begins to communicate with the reader 1.

Naturally, in entertainment-electronics applications (TV, DVD), for example, the simple form of detection described above can be replaced with a more advanced and expensive circuit, utilizing, for example, the infrared receivers of remote-controlled devices.

In practice, it is possible that, in some embodiments, it will be necessary to make more complex electronics, to be able to ensure the presence of the optical signal. However, the essential feature is that the synchronization of the radio path and the optical link permits the optical signal to be detected using a very low measurement power.

Both the touching (TouchMe) and pointing (PointMe) concepts can be applied to obtain data from the desired product. For example, when looking for new shoes, one can first of all touch one's own shoes, when the size of shoe and other data will be transferred to the mobile station. This information can be used when buying new shoes. The light source can also be pointed at a light, when a sticker will tell the mobile station that the light can be controlled, for example, using Bluetooth and the remote identifier activates communications immediately, the light comes on, and possibly the mobile station can be used to adjust the light's brightness. If a light or TV can be controlled using infrared, the remote identifier will also tell this and automatically active the function in the mobile station required for control. By using the touching (TouchMe) concept embedded in the mobile station, or on the other hand the pointing (PointMe) concept connected to the remote identifier and a remote-identifier reader in the mobile station, the mobile station will very economically be turned into a device, which can be used to collect information on desired products, or to control the environment, by either pointing to products or devices, or by touching them. For example, if we touch another person's business card that is equipped with a remote identifier with a mobile station, the information on the person's business card will be automatically transferred to the mobile station. The data can be taken from the identifier as such, or else the identifier will activate Bluetooth in the reading mobile station, which will, in turn, read the necessary data from the mobile telephone of the person owning the business card, without anyone pressing the keys of the mobile telephone. By touching the service manual of a car, the mobile station will automatically contact the nearest service facility. Corresponding examples can be invented endlessly. The essential feature is that, by adding the said properties to both the reader and the remote identifier, the invention can be used to offer consumers a 'physical' interface with the environment, through a personal handheld device. This permits an interface that is concrete and very natural to people, and which can be tailored separately for each consumer.

Both the pointing and the touching methods are also highly suitable for use in connection with remote sensor technology. Thus, for example, readings can be obtained from a remotely read temperature sensor, without disturbing other sensors. For example, this makes it possible to obtain a reading from a sensor in a wine bottle, either by pointing to the sensor, or by bringing the reader (e.g., a mobile telephone) close to the sensor.

The invention claimed is:

1. A remote identifier that can be attached to products, which includes
   a microcircuit, in which there is a memory and a unit for processing a radio-frequency signal and
   an antenna connected to the microcircuit, for receiving both the signal and also electric power for the operating voltage of the microcircuit,
   an electrical component, whose electrical properties change due to the effect of infrared, or visible light, is electrically connected to the microcircuit of the remote identifier and
   the microcircuit includes a system which calculates, when the remote identifier is active, the combined effect of a change in the radio-frequency signal and a signal associated with the electrical component by a correlation method, and, if a correlation is detected, the remote identifier is selected for two-way data transmission.

2. A remote identifier according to claim 1, wherein the electrical component that changes electrically due to the effect of radiation is a photosensitive polymer resistance.

3. A reader for reading a remote identifier, which reader includes
   a unit for transmitting and receiving a radio-frequency signal to and from the remote identifier,
wherein
   the reader includes a light source, and
   a control unit for the light source, with which a signal of the light source is synchronized with the radio-frequency signal so that parts of the signal of the light source and parts of the radio-frequency signal occur at the same time;
   wherein the remote identifier is selected for two-way communication with the reader responsive to a detected correlation of the two signals by the remote identifier.

4. A reader according to claim 3, wherein the reader is integrated in a mobile station.

5. A method in a reader of remote identifiers, said method comprising:
   sending reader information to a remote identifier;
   receiving information from the remote identifier,
   sending a signal in the infrared or visible light range to the remote identifier simultaneously with a radio frequency signal, wherein the signal in the infrared or visible light range is synchronized with the radio-frequency signal so that parts of the signal in the infrared or visible light range and parts of the radio-frequency signal occur at the same time,
   wherein the remote identifier is selected for two-way communication with the reader responsive to a detected correlation of the two signals by the remote identifier.

6. A remote-identifier system, which includes
a reader, capable to perform radio-frequency transmission and reception,
a remote identifier, capable to perform radio-frequency two-way communication with the reader and capable to exploit the energy radiated by the reader as its own operating voltage,
wherein
the reader includes a light source operating in the infrared or visible light range and a control unit for controlling the light source in synchronization with a radio-frequency signal, and
the remote identifier includes
a unit for detecting the simultaneous presence of a light signal and a radio-frequency signal, and
a microcircuit which determines, when the remote identifier is active, the combined effect of a change in the radio-frequency signal and a signal related to the light signal by a correlation method for the signals, and if a correlation is detected between the signals, the remote identifier is selected for two-way data transmission.

7. A remote-identifier method, the method comprising:
sending to the remote identifier a radio frequency signal containing radio-frequency information and electrical power, with the aid of a reader,
using the remote identifier, receiving and transmitting radio-frequency information using the radio-frequency signal as operating energy,
transmitting a radiation signal in the infrared or visible-light ranges, in synchronization with the radio frequency signal, using the reader, and
detecting the simultaneous presence of the light signal and the radio-frequency signal using the remote identifier, and determining, when the remote identifier is active, the combined effect of a change in the radio-frequency signal and a signal related to the light signal by a correlation method for the signals, and, if a correlation is detected between the signals, selecting the remote identifier for two-way data transmission.

* * * * *